C. G. HALL.
AUTOMATIC TIRE PUMP.
APPLICATION FILED FEB. 9, 1917.
1,254,903.
Patented Jan. 29, 1918.
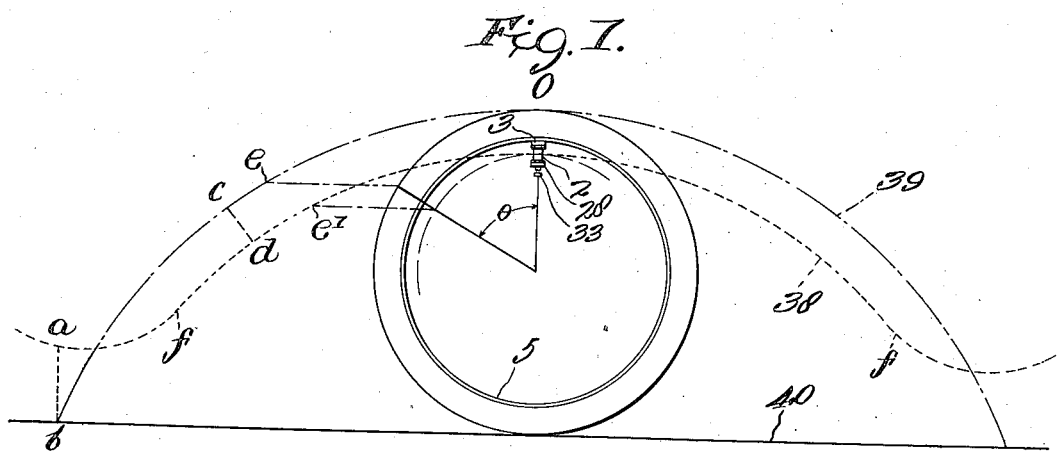
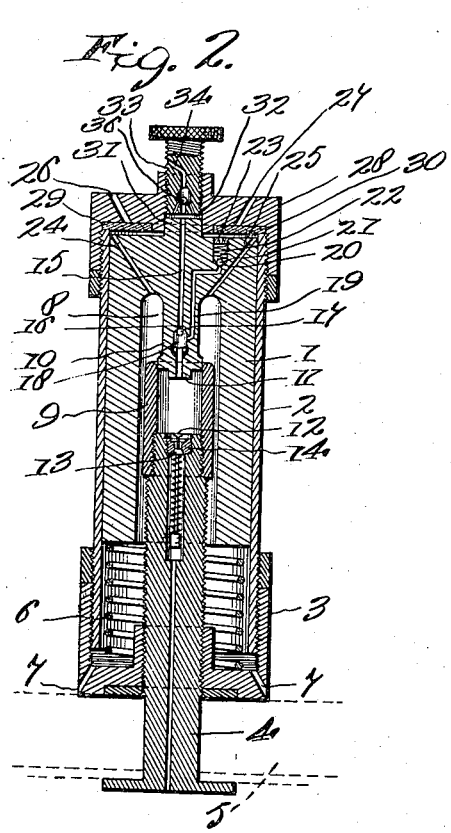
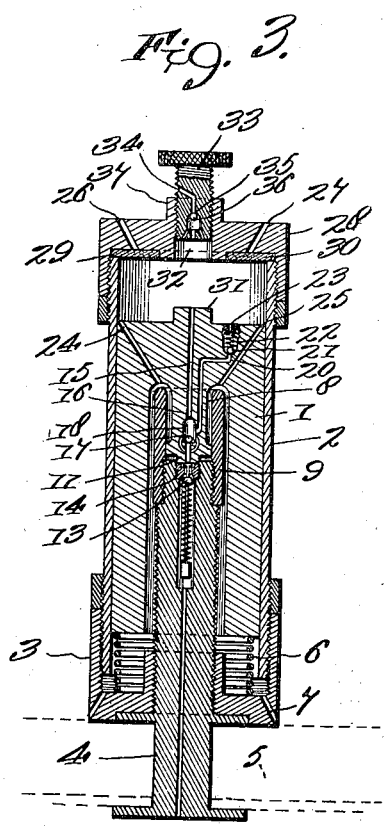
Witnesses
Inventor
Chalmers G. Hall,
by Wilkinson, Guista & MacKaye.
Attorneys

UNITED STATES PATENT OFFICE.

CHALMERS G. HALL, OF THE UNITED STATES ARMY.

AUTOMATIC TIRE-PUMP.

1,254,903.  Specification of Letters Patent.  Patented Jan. 29, 1918.

Application filed February 9, 1917. Serial No. 147,684.

*To all whom it may concern:*

Be it known that I, CHALMERS G. HALL, of the United States Army, a citizen of the United States, stationed at San Francisco, in the county of San Francisco and State of California, have invented certain new and useful Improvements in Automatic Tire-Pumps; and I do hereby declare the following to be a full, clear, and exact description of the invention, such as will enable others skilled in the art to which it appertains to make and use the same.

The present invention relates to improvements in automatic tire pumps in which the pump is carried constantly by the vehicle wheel, and is in continuous or intermittent operation as conditions may require to maintain a predetermined pressure in the tire at all times and under all conditions and circumstances.

My present invention aims to improve the constructions of automatic tire pumps of the class above generally designated, and consists broadly in the provision of an improved pump, the working parts of which will be driven by the combined action of centrifugal force and an oppositely acting agency advantageously in the form of one or more coil springs; which forces will be active during the revolution of the vehicle wheel and will operate to maintain the tire constantly at a predetermined pressure; the invention also serving to relieve any excess pressure in the tire which may be the result of rapid running or weather conditions.

In the accompanying drawings forming a part of this application, and in which similar reference symbols indicate corresponding parts in the several views:

Figure 1 is a diagrammatic view illustrating my improved automatic pump as carried by a vehicle wheel and indicating the path taken thereby as the wheel revolves.

Fig. 2 is a longitudinal sectional view through my improved automatic pump taken on an enlarged scale, and showing the pump parts in one position; and Fig. 3 is a similar view with the pump parts in another position.

Referring more particularly to the drawings, 1 designates a plunger, which is fitted to reciprocate in a primary cylinder 2. This primary cylinder 2 is removably or otherwise secured in a base 3, which surrounds a valve stem 4 passing through the felly 5 of the vehicle wheel and secured to the inner tube in the usual manner. At 6 is a spring arranged in the base 3 and engaging beneath the plunger 1 to normally move the same outwardly in the primary cylinder 2 when the centrifugal force is not effective, or is below that degree for which the spring 6 is selected.

Openings 7 are made in the base 3 to permit the ready entrance and exit of atmospheric air, whereby the plunger 1 is rendered more ready in its movement. This plunger 1 is recessed, as indicated at 8, to receive the valve stem 4 and a secondary cylinder 9 of smaller dimensions, which is threaded or otherwise secured over the upper end of the valve stem 4, and which replaces the dust cap now used in this connection.

A piston 10 on the plunger 1 projects into the recessed portion 8, and when the parts are assembled is arranged to travel in the secondary cylinder 9, as will be clear from an inspection of Figs. 2 and 3. This piston 10 carries a projection 11 which is arranged to encounter the upper flattened end 12 of the tire valve stem, and to move the tire valve 13 from its seat in the removable plug 14 when the plunger 1 and piston 10 descend to the position shown in Fig. 3. By so dislodging the tire valve 13 from its seat any excess pressure in the tire may be given exit and the tire reduced to a predetermined pressure.

The plunger 1 and piston 10 are bored to provide a central air passage 15 in which is a valve seat 16 against which is adapted to close a ball or other valve 17. Communicating with an enlarged space 18 below the valve seat 16 is the lower end of a by-pass 19, wherein is formed a seat 20 for a ball or other valve 21. This ball valve 21 is held on its seat by a coil spring 22 under regulation by an adjustable plug 23, or other suitable means.

24 and 25 are oil grooves in the plunger 1 for delivering lubricant to the interior parts, and more particularly to the piston 10 and secondary cylinder 9. This oil is introduced to the cylinder through ports 26 and 27 in a head 28 which incloses the upper end of the primary cylinder 2. There are felt pads 29 and 30 at the bases of the ports 26 and 27 for absorbing and properly distributing the oil introduced therethrough.

A boss 31 on the top of the plunger 1 is received into a central opening 32 in the cylinder head 28, which receives a threaded plug 33 having an air passage 34 therein in communication with the outside atmosphere. A seat 35 is provided in the air passage 34 against which a valve 36 closes when the plunger 1 moves upwardly in the primary cylinder 2 with reference to the positions of the parts as shown in Figs. 2 and 3. When it is desired to cut off the communication of air with the pump, the threaded plug 33 may be screwed down to cause the air passage 34 to be masked within a flange 37 upstanding from the head 28, in which position the pump will be obviously out of operation.

As above stated, the improved device takes the place of the ordinary dust cap now found covering the tire valve stems, and when in position the improved pump will be carried around within the rim or felly 5 of the vehicle wheel, as indicated in Fig. 1. The path described by the pump will therefore be substantially a trochoid, which is indicated by the dotted line 38. The cycloid curve is indicated by the broken line 39, and the right line, which corresponds with the roadway over which the vehicle is moving, is designated by the full line 40.

The operation of the invention will be described substantially as follows:

When the plunger 1 descends in the primary cylinder 2 under the influence of centrifugal force, it will draw the valve 36 from its seat in the plug 33 and cause an inrush of air from the outside atmosphere through the passage 34. This action of the plunger 1 will be in opposition to the coil spring 6, which latter will be compressed as illustrated in Fig. 3. When the centrifugal force falls below the strength for which the spring 6 is selected, this latter will again become effective and return the plunger 1 in the opposite direction, or in other words move the same upwardly in the primary cylinder 2 to the position shown in Fig. 2. During this upward movement the valve 17 in the passage 15 will be moved from its seat by the inrush of air compressed above the plunger 1, and which compression closes the valve 36 against its seat 35 in the plug 33 and prevents the exit of any air through the passage 34. It will thus be seen that most of the air which has been drawn from the atmosphere into the primary cylinder 2 on descent of the plunger 1, will be transferred through the passage 15 to the secondary cylinder 9, this action of transference taking place when the plunger 1 is subsequently moved upwardly; while some of this air will escape through the oil ports and between the walls of cylinder 2 and plunger 1 which is a loose fit in cylinder 2.

On the next following descent of the plunger 1 the valve 17 will automatically close against its seat 16 and obstruct the return of the air through the passage 15, so that such air in the secondary cylinder 9 will be compressed to a high degree as the piston 10 descends therein, and will rapidly be raised to a higher degree than the pressure within the tire, whereby the tire valve 13 will be forced open as indicated in Fig. 3, and the air from the secondary cylinder 9 pumped thereinto. In case the tire valve 13 would have a tendency to stick on its seat, the projection 11 will encounter the flat upper end 12 of its stem and positively remove it, as will clearly appear from the position of these several parts in Fig. 3.

Where the pressure in the vehicle tire is already at the predetermined degree, there will be a resistance to the introduction of the air in the cylinder past the tire valve 13 such as will be greater than the strength of the adjusting spring 22, and consequently the valve 21 will rise from its seat 20 and permit the escape of the air in the secondary cylinder 9 through the by-pass 19 and into the chamber above the plunger 1. Thus the air will take a circuit through the plunger at all times when the predetermined pressure in the tire obtains; otherwise it will be forced into the tire to raise the pressure therein to that predetermined degree.

Now in order to effect the reciprocating action of the pump plunger, it will be necessary to find the value of the centrifugal force for the various positions of the pump when the wheel revolves. The value of the centrifugal force, $$f = \frac{MV^2}{\rho}$$

in which M is the mass of the moving body, V the velocity of the body in feet per second, and $\rho$ the radious of curvature of the curve described by the body. In case the curve is a circle then $\rho = r$, the radius of the circle. But any point of a circle revolved along a straight line, as a wheel along the ground, generates the cycloid curve, in which $\rho$ at the point of origin is equal to zero and at the highest point of the curve is equal to twice the diameter of the generating circle.

Thus if we take the expression representing the centrifugal force and substitute a value for V and $\rho$, assuming a definite value of $f$ we may determine the mass and in consequence the weight of a body which will set up the assumed centrifugal force under the conditions assumed. Assume the center of the circle or wheel in Fig. 1 to be 2 feet in diameter and to be moving horizontally to the right at the rate of 30 feet per second.

Assume $f = 4$ pounds $$M = \frac{W}{g} = \frac{W}{32.2}$$

in which $g$ is the acceleration due to gravity then we have for the point of origin of the cycloid $$4 = \frac{\frac{W}{32.2} \times 0}{\text{zero}}$$

V being zero because the generating point at the circle at the origin can have no velocity. But if we substitute values for V and $\rho$ when the generating point of the circle is at O the highest point of the cycloid we have $$4 = \frac{\frac{W}{32.2} \times (30 \times 2)^2}{4 \times 1}$$

In the first substitution $V = 0$ which means there is no centrifugal force.

In the second substitution $W = .14$ pounds.

Interpreting this last value we see that a weight of .14 of a pound moving along a cycloid with the center of the generating circle moving 30 feet per second will set up a centrifugal force varying from 0 at the point of origin to 4 pounds (the assumed value) at the highest point of the curve, and further by inspection it may be seen that the centrifugal force will decrease from this latter point from 4 pounds to zero at the second point of origin.

Applying these deductions to my invention, it will be seen that the center of gravity of the plunger 1 for any given position in the primary cylinder 2, will describe a trochoid whose characteristics are similar to those of the corresponding cycloid. However, at the point of origin of the cycloid, the center of gravity of the plunger 1 will occupy a position $a$, on the trochoid, with a velocity at the instant which will be proportional to the horizontal speed at the center of the generating circle as the distance $ab$ is to the radius of the circle. Thus, if $ab$ is $\frac{1}{4}$ of a foot and $r$ is 1 foot with an assumed horizontal speed at the center of the generating circle of 30 feet a second, then the velocity of the center of gravity of the plunger 1 will be $$\frac{ab}{r} \times 30$$

or 7½ feet per second. This velocity will increase to a maximum to a point on the trochoid corresponding to the vertex O of the cycloid and at this point will be equal to $$\frac{2 - \frac{1}{3}}{1} \times 30$$

or 50 feet per second, $ab$ at the vertex being equal to the diameter of the generating circle less the distance of the center of gravity of the plunger 1. This deduction is upon the assumption that the plunger remains stationary in its outward position corresponding to the point of origin of the cycloid. This, however, will not be the case, the plunger 1 moving inwardly toward the felly on its pumping stroke, $ab$ would accordingly be increased and the velocity also increased.

There will be a centrifugal force generated and acting on the plunger when it is in position on the trochoid corresponding to the point of origin of the cycloid, but because the velocity of the plunger 1 is relatively small, and though $\rho$ in this position is also small, by inspection of the expression $$f = \frac{MV^2}{\rho}$$

for the centrifugal force, it may be seen that the centrifugal force at this moment is considerably less than that generated in the position corresponding to the vertex of the cycloid, though it has a value and would have the effect of at least partially causing the plunger 1 to move inwardly. However, at the point $f$ on the trochoid $\rho$ changes its sign through infinity because the curvature of the trochoid changes at this point so that when $\rho = \infty$, $$f = \frac{MV^2}{\rho} = 0,$$

which interpreted means that the centrifugal force is zero at this point. This force increases to a maximum at a point on the trochoid and then decreases again to zero; at the next point on the generated trochoid $\rho$ changes its sign.

If the plunger 1 weighs .14 of a pound, at the point when its generated trochoid is changing its sign there will be no centrifugal force, but as the wheel revolves (30 feet per second) the value will at its highest point, be traveling at the rate of $$\frac{2 - \frac{1}{3}}{1} \times 30 = 50 \text{ feet per second}$$

and will generate a force of 4 pounds if its center of gravity were located on the cycloid, but in actuality will only generate $$f = \frac{MV^2}{\rho} \text{ pounds.}$$

$\rho = 4r \cos \frac{1}{2}\theta$ which at the vertex of the cycloid $= 4$, $r$ being equal to unity and θ=zero. The value of ρ for the trochoid will be as much less than for the cycloid by the distance of the center of gravity of the plunger 1 from the outside of the wheel. This we have heretofore assumed as ⅓ so ρ for the trochoid would be equal to 3⅔ substituting in the above expression for $$f = \frac{MV^2}{\rho} = \frac{\frac{W}{g} \times V^2}{\rho}$$

we have $$\frac{\frac{.14}{32.2} \times (50)^2}{3\frac{2}{3}}$$

or $f = 2.6$ pounds. At the point on the trochoid when $\rho = \infty$ the coil springs 6 will hold the plunger 1 against the cylinder head, but as the centrifugal force is gradually set up these springs will be compressed and the piston 10 which pumps air to the valve 17, will descend in the secondary cylinder 9.

If we assume the area of the head of the piston proper to be ¼ square inch, and if, under the above assumptions, for the values of $f$, $V$ and $\rho$ be taken, we find that, disregarding friction and the force necessary to overcome the springs 6 a pressure of $2.6 \times 16 = 41.6$ pounds per square inch will be set up. In other words, the pump will when the automobile is traveling 30 feet per second (equal about 20 miles per hour) pump tires to 41.6 pounds per square inch. By varying the weight of the plunger 1 pumps may be made to suit pressures for all sizes of tires.

In Fig. 1 the pump is shown as following one of a series of trochoid paths 38. In such case the radius of curvature changes sign by passing through infinity at certain points near the origin of the corresponding cycloid; where the centrifugal force will be equal to zero. The radius of curvature above represented by ρ will be then expressed in the formula $\rho = 4r \cos \frac{1}{2}\theta$ as the trochoid 38 generally has the characteristics of the corresponding cycloid 39, the centrifugal force varies from maximum at the vertex or highest point O to zero where $\rho = \infty$, when radius of curvature changes sign. On trochoid curve 38, where ρ is negative its value is small, but velocity of generating point is low, hence centrifugal force will be small.

It is obvious that those skilled in the art may vary the details of construction and arrangements of parts without departing from the spirit of my invention, and therefore I do not wish to be limited to such features except as may be required by the claims.

I claim:

1. The combination with a rotating and rolling part, of a pump secured thereto and rotating and traveling therewith so as to follow a trochoidal path, a plunger forming a portion of said pump and movable outwardly under the action of centrifugal force, and means for returning said plunger in the opposite direction, substantially as described.

2. The combination with a traveling and rotating part, of a pump carried thereon and following a trochoidal path, a plunger forming a part of said pump and being movable in an outward direction by centrifugal force, and spring means for moving the plunger on the return inward stroke, substantially as described.

3. The combination with a rotating and rolling vehicle wheel, of an automatic tire pump including a cylinder carried directly by said vehicle wheel and following a trochoidal path, a plunger fitted to travel in said cylinder and movable in a direction away from the wheel center by centrifugal force, and independent means for returning said plunger in the opposite direction, substantially as described.

4. The combination with a rotating and rolling wheel, and a tire mounted on said wheel and having a valve stem, of an automatic pump removably fitted over said valve stem so as to rotate with said wheel and follow a trochoidal path, a plunger forming a portion of said pump, said plunger being adapted to be thrown outwardly from the wheel center by virtue of centrifugal force, said plunger being adapted to compress air and deliver same through the valve stem to said tire, and means for moving the plunger in the opposite direction when said centrifugal force is overcome, substantially as described.

5. The combination with a vehicle wheel having a pneumatic tire mounted thereon equipped with the usual valve stem, of a secondary cylinder removably attached to said valve stem, a piston traveling in said secondary cylinder and adapted to compress air therein and deliver same through the valve stem to said pneumatic tire, a plunger carrying said piston and thrown outwardly from the wheel center under the action of centrifugal force, a primary cylinder for said plunger, means for admitting air to said primary cylinder, said plunger having a passage therein for delivering the air drawn in said primary cylinder to the secondary cylinder, and means for forcing the plunger inwardly toward the wheel center, substantially as described.

6. The combination with a tire valve stem having a valve therein, of a pump cylinder placed over said valve stem, a piston traveling in said cylinder for compressing air therein and delivering the same through the valve stem to said tire, and a projection on said piston for encountering the air valve stem and positively unseating said valve, substantially as described.

7. The combination with a rotating and rolling vehicle wheel, and a pneumatic tire carried thereby and having the usual valve stem with the air valve therein, a primary enlarged cylinder fitted over said valve stem and traveling in a trochoidal path, means for admitting air to and cutting off air from said primary cylinder, a plunger fitted to travel in said primary cylinder and movable outwardly solely by centrifugal force, spring means for shifting said plunger in the opposite direction, a secondary cylinder removably connected to said valve stem, a piston carried on said plunger and fitted to travel in said secondary cylinder, said plunger and piston having a passage therein for establishing communication between said primary and secondary cylinders, a check valve in said passage, said plunger and piston also having a by-pass therein setting up communication between said primary and secondary cylinders, a check valve in said by-pass, means for regulating the degree of pressure at which said by-pass check valve may open, means for admitting oil to said primary and secondary cylinders, and a projection on said piston adapted to encounter the stem of the air valve and positively unseat the same, substantially as described.

In testimony whereof, I affix my signature.

CHALMERS G. HALL.